United States Patent [19]
Rempala

[11] 3,812,375
[45] May 21, 1974

[54] MEANS FOR SENSING MOVING WEB MATERIAL

[75] Inventor: Chester S. Rempala, Chicago, Ill.

[73] Assignee: A. B. Dick Company, Chicago, Ill.

[22] Filed: Apr. 5, 1973

[21] Appl. No.: 348,285

[52] U.S. Cl. .......................... 250/570, 235/61.11 E
[51] Int. Cl. ............................................. H01j 39/12
[58] Field of Search... 250/219 FR, 219 D, 219 DD, 250/219 DC, 219 DR, 219 DF; 235/61.11 E, 92 V; 340/173 LM, 173 LS, 173 LT, 174 YC; 40/28 B; 178/7.89, 7.9, 7.91, 7.6

[56] References Cited
UNITED STATES PATENTS

| | | | |
|---|---|---|---|
| 2,944,156 | 7/1960 | Davy | 250/219 DC |
| 3,617,105 | 11/1971 | Konrad | 250/219 FR |
| 3,423,592 | 1/1969 | Selgin | 250/219 FR |
| 2,971,716 | 2/1961 | Sampson | 250/219 FR |
| 3,632,226 | 1/1972 | Filby | 250/219 FR |
| 3,175,194 | 3/1965 | Golay | 250/219 DD |
| 3,458,709 | 7/1969 | Beall | 250/219 DD |
| 3,524,067 | 8/1970 | West | 250/219 DD |
| 3,696,344 | 10/1972 | Feinleib | 340/173 LT |

*Primary Examiner*—Archie R. Borchelt
*Assistant Examiner*—D. C. Nelms
*Attorney, Agent, or Firm*—McDougall, Hersh & Scott

[57] ABSTRACT

The microfilm strip has frame marks or "blips" spaced along the length of the film adjacent one margin thereof. A pair of glass flats are mounted on each side of the path of movement of the film and define a film gate. The glass flats include respective inclined reflective surfaces arranged to cooperate with a source of light for directing a beam of the light along a path which passes through the marginal portion of the film containing the frame marks. The sensing means is responsive to interruptions in the light beam caused by passage of the frame marks on the microfilm. The arrangement of the aforesaid reflective surfaces permits the light source and the sensing means to be physically located beyond the edge of the film defining the aforesaid marginal portion such that the components of the sensing system do not interfere with projection or viewing of the image transparencies on the film.

7 Claims, 3 Drawing Figures

PATENTED MAY 21 1974 3,812,375

MEANS FOR SENSING MOVING WEB MATERIAL

BACKGROUND OF THE INVENTION

1. Field of the Invention

The present invention relates generally to sensing moving web material. More particularly, the present invention relates to sensing frame marks on film, such as microfilm, by the use of a light source and sensing means responsive to interruptions in the beam of light emitted from the source. The information sensed may be used for counting the frames on the film, for controlling drive components for the film reels, or for energizing associated equipment, for example.

2. The Prior Art

It is known in the prior art to provide various sensing systems for sensing passage of moving web material, such as film or the like. These systems generally employ a source of light and sensing means responsive to interruptions in the beam of light emitted from the light source, such interruptions being caused by marks on the film, which marks may be either opaque or translucent depending on the light transmitting properties of the areas of the film adjacent such marks. In the case of microfilm, for example, a frame mark may be provided adjacent each image frame for the purpose of actuating automatic equipment, such as a counter employed in a microfilm printer/reader. Microfilm so marked may be of the type referred to in the art as computer output microfilm.

In the sensing systems of the type under consideration, the beam of light must of course be passed through the moving film. This requires that at least some of the components which define the sensing optical path to be located between the marginal portions of the film. It is preferable to mount the sensing means adjacent the gate wherein the film is viewed or projected, thereby to permit the frame marks on the film to be located immediately adjacent the associated image transparency. Accordingly, in order to satisfy the aforesaid requirements, it is often difficult to locate and mount the various components of the sensing system such that they do not interfere with the unobstructed viewing or projection of the images on the film.

SUMMARY AND OBJECTS OF THE INVENTION

The invention may be summarized as relating to a system for sensing passage of a moving web having first and second areas of different ray energy transmitting properties alternately spaced longitudinally of the film adjacent one marginal portion thereof, which system includes new and improved means defining a folded path for the ray energy beam thereby permitting the various components of the system to be mounted beyond the edge of the web defining the aforesaid marginal portion.

A primary object of the present invention is the provision of a new and improved sensing system for sensing passage of a moving web, which system includes first and second ray energy beam directing elements for defining a folded ray energy beam path, with a portion of such path extending through a marginal portion of the moving web and with the remaining portions of the path being disposed substantially beyond the edge of the web defining such marginal portion.

Another object of the present invention is the provision of a sensing system of the type described which includes type source of light and a pair of reflective surfaces, the latter being mounted such that only a marginal portion of the film passes therebetween, and with the remaining components of wall system being disposed beyond the edge of the film defining such marginal portion.

Still another object of the present invention is the provision of a new and improved system of the type described, wherein a pair of glass flats are mounted in parallel spaced relation for defining a film gate, and wherein the glass flats each have a recess with an inclined wall provided with a reflective surface, these surfaces defining a folded optical path for the light beam of the sensing system.

These and other objects and advantages of the present invention will become apparent from the following specification disclosing a preferred embodiment shown in the accompanying drawings.

DESCRIPTION OF THE PREFERRED EMBODIMENT

Figure 1:
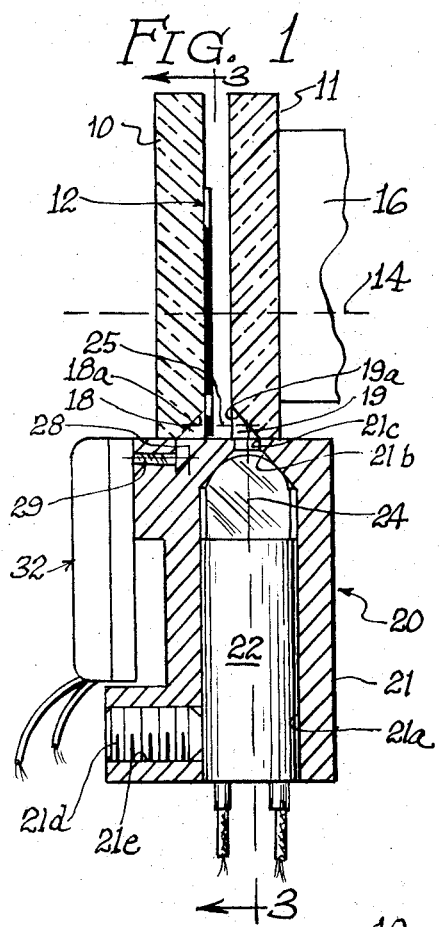
FIG. 1 is a vertical section illustrating the present invention, with the glass flats defining the film gate being shown in the film "transport" position.

The present invention will be described within the context of a printer/reader which receives computer output microfilm. Such a machine permits the microfilm images to be viewed and copies thereof to be made, as selected by the operator. An example of such a machine is the Model 800 Automatic Microfilm Enlarger Printer, manufactured by A. B. Dick Company of Chicago, Ill., the assignee of the present invention. However, it will be understood that the present invention is not to be limited for use in such a machine, as the invention has applicability for sensing not only other types of film but other forms of moving web material.

Referring to the drawings, a pair of glass flats 10, 11 define a film gate for the microfilm, generally designated 12. The associated equipment, such as the above referred to printer/reader, includes various components (not shown), such as a source of light and lenses, for defining an optical axis 14 which passes through the center of each image frame 15 on the microfilm.

Figure 2:
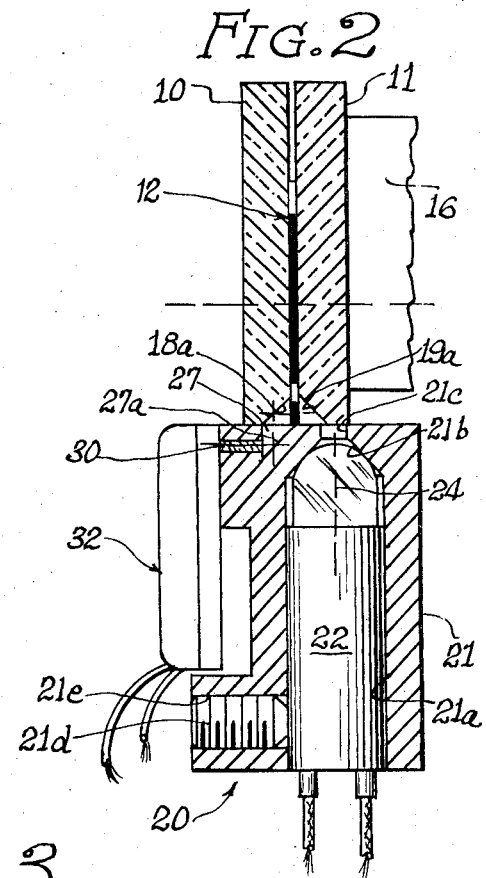
FIG. 2 is a section similar to FIG. 1, the glass flats being shown in their "focus" position.

The glass flat 10 is fixed in place. However, the glass flat 11 is preferably mounted between a pair of guides 16 for reciprocal movement along the optical axis 14 back and forth between a "transport" position shown in FIG. 1 and a "focus" position shown in FIG. 2. When the glass flats are in spaced relation in the "transport" position as shown in FIG. 1, the microfilm 12 may be transported at high speed between the glass flats by supply and take-up reels, such reels and the drive means therefor being well known to those skilled in the art and consequently requiring no description or explanation herein. When movement of the film is stopped for centering a selected frame 15 on the optical axis 14, the glass flat 11 is moved into engagement with the film as seen in FIG. 2 thereby to support the film in a planar configuration between the two glass flats for optimum focusing of the selected transparency.

The glass flat 10 is provided with a notch or recess 18 having one wall inclined at a 45° angle and provided with a suitable reflective material thereby to define a reflective surface 18a. Similarly, the glass flat 11 includes a recess 19 having an inclined reflective surface 19a. It will be understood that the recesses 18, 19 are arranged for being in generally oppositely disposed relationship with each other.

The sensing system generally designated 20, is modular in form and includes a housing block 21. The housing includes a bore 21a receiving a light source element 22, which element preferably includes an incandescent bulb and a lens for directing a beam of light along the path or axis 24. The bore 21a joins with a frusto-conical portion 21b, the latter communicating with a port 21c. The light source element 22 is held in place by a set-screw 21d threadingly received in a bore 21e, the latter communicating with the bore 21a. For purposes of illustration only, it will be assumed that the light element 22 emits a beam of light in the visible spectrum; however, the invention is not to be so limited as light in the infrared or ultraviolet spectrums might also be employed.

The beam of light being emitted along the path 24 strikes the reflective surface 19a and is then directed along a path 25. The beam portion 25 passes through a marginal portion of the film perpendicularly thereof and strikes the reflective surface 18a.

The housing block 21 includes a recess 27 having an inclined wall 27a in parallel relation with the reflective wall 18a. The wall 27a is provided with a suitable reflective material. It is apparent that light striking the reflective surface 18a will be reflected to the surface 27a along the path 28.

The housing block 21 also includes one or more bores 29 each receiving a fibre optic element 30. The fibre optic element or elements 30 extend to a suitable solid state sensor module, generally designated 32, which module is suitably secured to the housing block 21. It will be apparent that the light beam passing along the path 28 will be reflected through the fibre optic element or elements 30 by means of the reflective surface 27a, thereby to energize the sensing circuitry.

Figure 3:
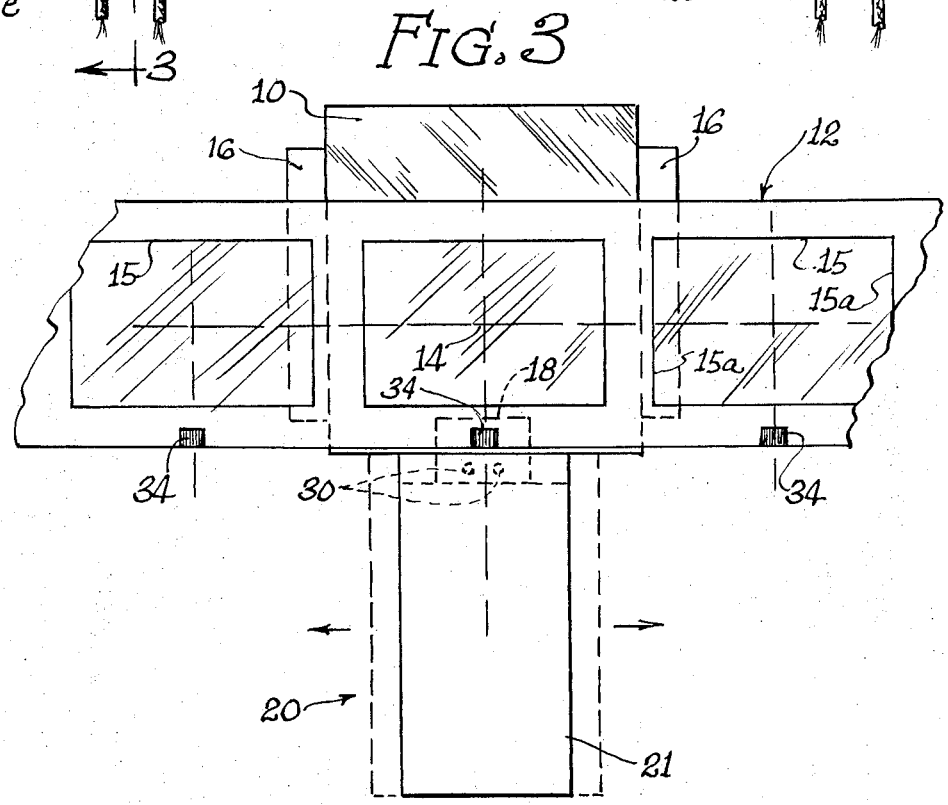
FIG. 3 is a section taken along the line 3—3 of FIG. 1.

Referring to FIG. 3, the microfilm 12 includes a frame mark or "blip" 34 adjacent each image transparency or frame 15. It is noted that the "blips" 34 are spaced longitudinally of the film along one marginal portion thereof. In the microfilm shown for purposes of illustration, the "blips" 34 are opaque and the adjacent marginal portions of the film are translucent or transparent. Of course, should the marginal portion of the film which contains the "blips" 34 be opaque, the "blips" would in that event be either transparent or translucent.

The sensor module 32 is responsive to light pulses generated as the result of the "blips" 34 interrupting the light as it passes along the path portion 25. As will be apparent from the drawings, the microfilm 12 is supported relative to the glass flats such that the marginal portion of the film containing the "blips" 34 will pass between the two reflective surfaces 18a, 19a which define the light beam portion 25. The sensor 32 responsive to these pulses may be associated with automatic equipment for counting the frames, for controlling the film reel drive components, or for energizing or actuating other equipment, as may be desired for the particular application.

It will be apparent that the present invention permits virtually all of the components of the sensing system to be physically located beyond the edge of the film defining the marginal portion including the "blips" 34. Only the reflective surfaces 18a, 19a need be mounted on opposite sides of the marginal portion of the film — these surfaces may be made quite small and do not interfere with the projection or viewing of the image transparencies on the film. In the event glass flats are not employed to define the film gate, it will be apparent to those skilled in the art that various other structures could be provided to define the reflective surfaces 18a, 19a.

With the use of some film, the "blips" 34 may not be centered with respect to opposite edges 15a of the associated image frame as shown in FIG. 3. Therefore, it is desirable to mount the housing block 21 such that the same may be adjusted longitudinally of the film 12 as indicated by the arrows in FIG. 3. For this reason, the reflective surfaces 18a, 19a extend longitudinally of the direction of film movement for a substantial distance, as illustrated in FIG. 3.

I claim:

1. In a system for sensing passage of a moving web having first and second areas of different light transmitting properties alternately spaced longitudinally thereof adjacent at least one marginal portion of the web, the improvement comprising:
   a. means for supporting such web material for movement along the length thereof;
   b. a source for emitting a beam of light and means mounting the same beyond and outwardly of the edge of the web defining said one marginal portion;
   c. first and second light beam directing elements and mounting means supporting the same such that said marginal portion of the web will pass between said elements, said elements being arranged to cooperate with said source for defining a continuous, folded, light beam path having an intermediate portion and first and second portions disposed substantially beyond and outwardly of said edge of the web, the intermediate portion of said path being arranged to pass through said one marginal portion of the web, the first portion of said path extending between said source and said first beam directing element; and
   d. sensing means and means mounting the same beyond and outwardly of said edge of the web, such mounting means also locating said sensing means in the second portion of said path, said sensing means being responsive to variations in the transmission of light caused by said first and second web areas passing through the intermediate portion of said path.

2. The improvement according to claim 1 further defined by:
   a. said web being a film having said first and second areas defined by respective opaque and translucent areas; and
   b. said beam directing elements being reflective surfaces.

3. The improvement according to claim 2 wherein said first and second reflective surfaces are arranged such that the intermediate portion of said path is rectilinear and passes through the web perpendicularly thereof adjacent a marginal portion of the film.

4. The improvement according to claim 3 wherein said first and second reflective surfaces are arranged such that said portions of said path are co-planar, with said first and second portions being perpendicular with said intermediate portion.

5. The improvement according to claim 2 further defined by:
   a. first and second planar members mounted adjacent respective opposite faces of the film in parallel relation therewith and defining a film gate; and
   b. said first and second members constituting at least a part of said mounting means and having respective inclined walls defining said first and second reflective surfaces.

6. The improvement according to claim 5 wherein said first and second planar members are glass flats, each flat having a recess within an inclined wall provided with reflective material and thereby defining one of said reflective surfaces.

7. The improvement according to claim 6 wherein one of said glass flats is movable to and away from the film defining respective focus and transport positions of said one flat, said one flat carrying said one reflective surface and establishing said path only when one flat occupies said transport position.

* * * * *